(12) United States Patent
Carobolante et al.

(10) Patent No.: US 8,476,886 B1
(45) Date of Patent: Jul. 2, 2013

(54) DIFFERENTIAL HYSTERETIC DC-DC CONVERTER

(75) Inventors: Francesco Carobolante, Danville, CA (US); Stephen W. Bryson, Cupertino, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 778 days.

(21) Appl. No.: 12/127,670

(22) Filed: May 27, 2008

(51) Int. Cl.
- *G05F 1/565* (2006.01)
- *G05F 1/569* (2006.01)
- *G05F 1/575* (2006.01)

(52) U.S. Cl.
USPC ................................. 323/284; 323/285

(58) Field of Classification Search
USPC ............................... 323/280–286
See application file for complete search history.

(56) References Cited

U.S. PATENT DOCUMENTS

| | | | |
|---|---|---|---|
| 6,229,350 B1 * | 5/2001 | Ricon-Mora | 327/77 |
| 6,271,650 B1 | 8/2001 | Massie et al. | |
| 6,369,555 B2 | 4/2002 | Rincon-Mora | |
| 6,452,766 B1 * | 9/2002 | Carper | 361/18 |
| 6,791,306 B2 | 9/2004 | Walters et al. | |
| 7,279,875 B2 | 10/2007 | Gan et al. | |

OTHER PUBLICATIONS

Chunping Song "Optimizing Accuracy of Hysteretic Control", Feb. 2006, 6 sheets, Power Electronics Technology, National Semiconductor Corporation, Santa Clara, CA.

* cited by examiner

*Primary Examiner* — Adolf Berhane
*Assistant Examiner* — Nusrat Quddus
(74) *Attorney, Agent, or Firm* — Okamoto & Benedicto LLP

(57) ABSTRACT

A hysteretic DC-DC converter includes a reference circuit, a hysteretic comparator, and a control circuit. The hysteretic comparator may be configured to compare a monitored output of the converter to a reference signal generated by the reference circuit and to compare a load ground of the output of the converter to a reference signal ground of the reference signal. The hysteretic comparator may perform the aforementioned comparisons simultaneously. The hysteretic comparator may generate a comparator output based on the comparison of the output of the converter to the reference signal and the comparison of the load ground to the reference signal ground. The control circuit may vary a control output to increase or decrease the output of the converter based on the comparator output.

17 Claims, 8 Drawing Sheets

DIFFERENTIAL HYSTERETIC DC-DC CONVERTER

BACKGROUND OF THE INVENTION

1. Field of the Invention

The present invention relates generally to electrical circuits, and more particularly but not exclusively to voltage regulators.

2. Description of the Background Art

A DC-DC converter is a voltage regulator that receives a DC input voltage to generate a regulated DC output voltage. A hysteretic DC-DC converter, such as bang-bang and non-synchronous converters, is a type of DC-DC converter that maintains the output voltage within a hysteresis range relative to a reference voltage. One problem encountered when implementing hysteretic DC-DC converters is related to their relatively poor noise immunity. Any ground coupled noise from switching transients tends to disrupt operation of the converter's input hysteretic comparator, causing erratic operation and even instabilities especially at high output current levels. One way of solving this noise-related problem is to perform comprehensive analysis of the converter's layout. However, good converter performance is difficult to achieve even with the most thorough layout analysis. Another solution is to provide a larger hysteresis window to reduce sensitivity to noise, but this adversely affects accuracy of regulation.

SUMMARY

A hysteretic DC-DC converter includes a reference circuit, a hysteretic comparator, and a control circuit. The hysteretic comparator may be configured to compare a monitored output of the converter to a reference signal generated by the reference circuit and to compare a load ground of the output of the converter to a reference signal ground of the reference signal. The hysteretic comparator may perform the aforementioned comparisons simultaneously. The hysteretic comparator may generate a comparator output based on the comparison of the output of the converter to the reference signal and the comparison of the load ground to the reference signal ground. The control circuit may vary a control output to increase or decrease the output of the converter based on the comparator output.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
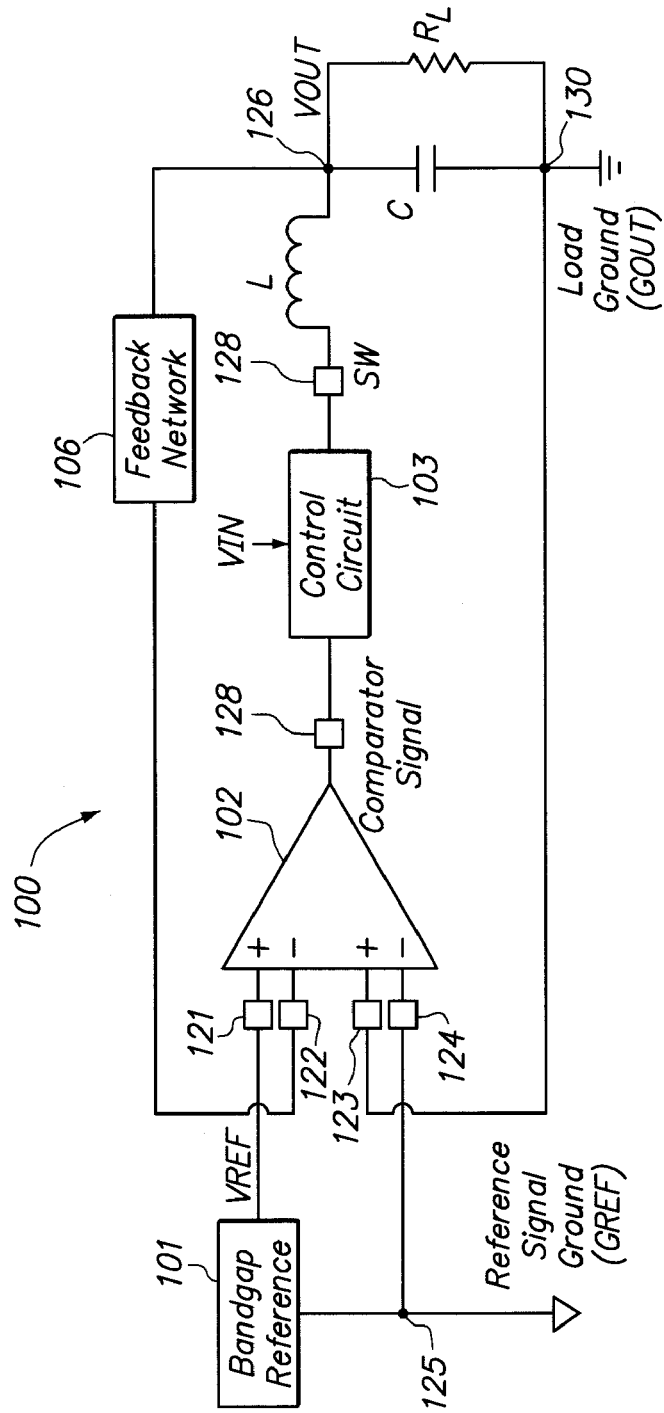
FIG. 1 shows a schematic diagram of a hysteretic DC-DC converter in accordance with an embodiment of the present invention.

FIG. 1 shows a schematic diagram of a hysteretic DC-DC converter 100 in accordance with an embodiment of the present invention. In the example of FIG. 1, the converter 100 includes a bandgap reference 101, a differential difference hysteretic comparator 102, and a control circuit 103. The control circuit 103 receives an input voltage VIN to generate a regulated output voltage VOUT to a load represented by the load resistor $R_L$ at a node 126. The control circuit 103 may employ conventional hysteretic control algorithm to modulate an output control signal, which may be a square-wave signal, at a switch node 127, with a duty-cycle such that the output voltage VOUT is maintained within regulation. The load is coupled to the converter 100 by way of an output inductor L and an output capacitor C. Electrical current flowing through the output inductor L is also referred to as "inductor current." The regulator 100 may further include a feedback network 106, which may comprise an impedance or RC network for frequency shaping, filtering, and/or other purposes.

The control circuit 103 may vary the duty cycle of its output control signal, also labeled as signal SW, at the switch node 127 to increase or decrease the output voltage VOUT as appropriate to achieve a regulated output voltage VOUT. In the example of FIG. 1, the hysteretic comparator 102 generates a comparator signal at a node 128 based on comparison of the output voltage VOUT to a reference voltage VREF generated by the bandgap reference 101. The hysteretic comparator 102 compares the output voltage VOUT to the reference voltage VREF within a hysteresis range.

The control circuit 103 may modulate its output control signal to increase or decrease the output voltage VOUT based on the comparator signal. For example, the control circuit 103 may modulate its output control signal to increase the output voltage VOUT when the comparator signal indicates that the output voltage VOUT is less than the reference voltage VREF (beyond the hysteresis range). Similarly, the control circuit 103 may modulate its output control signal to decrease the output voltage VOUT when the comparator signal indicates that the output voltage VOUT is greater than the reference voltage VREF (beyond the hysteresis range).

The reference voltage VREF uses a reference signal ground at a node 125 as ground reference, while the output voltage VOUT uses a load ground at a node 130 as ground reference. In an ideal situation, the load ground tied to the load at the node 130 is at the same potential as the reference signal ground tied to the bandgap reference 101 at the node 125. However, this is not the case in real-world circuits, especially when currents are large and thus requiring relatively large physical implementations. For example, switching transients may induce noise in the reference signal ground and load ground, adversely affecting the comparison of the output voltage VOUT to the reference voltage VREF. To alleviate this problem, the hysteretic comparator 102 simultaneously compares the (a) bandgap-generated reference voltage VREF at a node 121 to the output voltage VOUT at a node 122 and (b) the reference signal ground GREF at a node 124 to the load ground GOUT at a node 123. The comparison of the reference signal ground to the load ground subtracts any noise coupled between them. Such noise would effectively make the comparison of the reference voltage to the output voltage inaccurate. The comparison of the reference signal ground to the load ground thus advantageously makes the converter 100 less susceptible to ground noise.

The hysteretic comparator 102, in effect, compares two differential signals in order to correctly perform the computation:

$$VREF-VOUT \qquad (EQ. 1)$$

More accurately, assuming that either ground terminal may not be at the same zero volt reference voltage, the intended operation of the hysteretic comparator 102 is to compare (VREF−GREF) to (VOUT−GOUT), yielding the comparison operation:

$$(VREF-GREF)-(VOUT-GOUT) \qquad (EQ. 2)$$

The individual comparisons within the parentheses of EQ. 2 are relatively difficult to implement in integrated circuit design due to large difference in voltages, which would saturate traditional differential stages. Preferably, EQ. 2 is rewritten as follows:

$$(VREF-VOUT)+(GOUT-GREF) \qquad (EQ. 3)$$

The individual comparisons within the parentheses of EQ. 3 can be conveniently realized with the proposed differential-difference comparator because in this implementation the circuit adds the results of two comparisons, both of which are made between two signals that are relatively close in magnitude to each other, at least in normal operating conditions.

The example of FIG. 1 implements EQ. 3. In the example of FIG. 1, the first differential signal is at nodes 121 and 122 and the second differential signal is at nodes 123 and 124. More specifically, in the example of FIG. 1, the reference voltage VREF and the output voltage VOUT form the first differential signal, while the reference signal ground and the load ground form the second differential signal. Comparing the first and second differential signals results in a differential comparator output, which is converted to single-ended as the comparator signal at the node 128. Alternatively, the reference voltage VREF and the reference signal ground may form the first differential signal and the output voltage VOUT and the load ground may form the second differential signal as in EQ. 2. The example of FIG. 1 is preferred because it is easier to compare signals that are relatively close in value in actual circuits.

Figure 2:
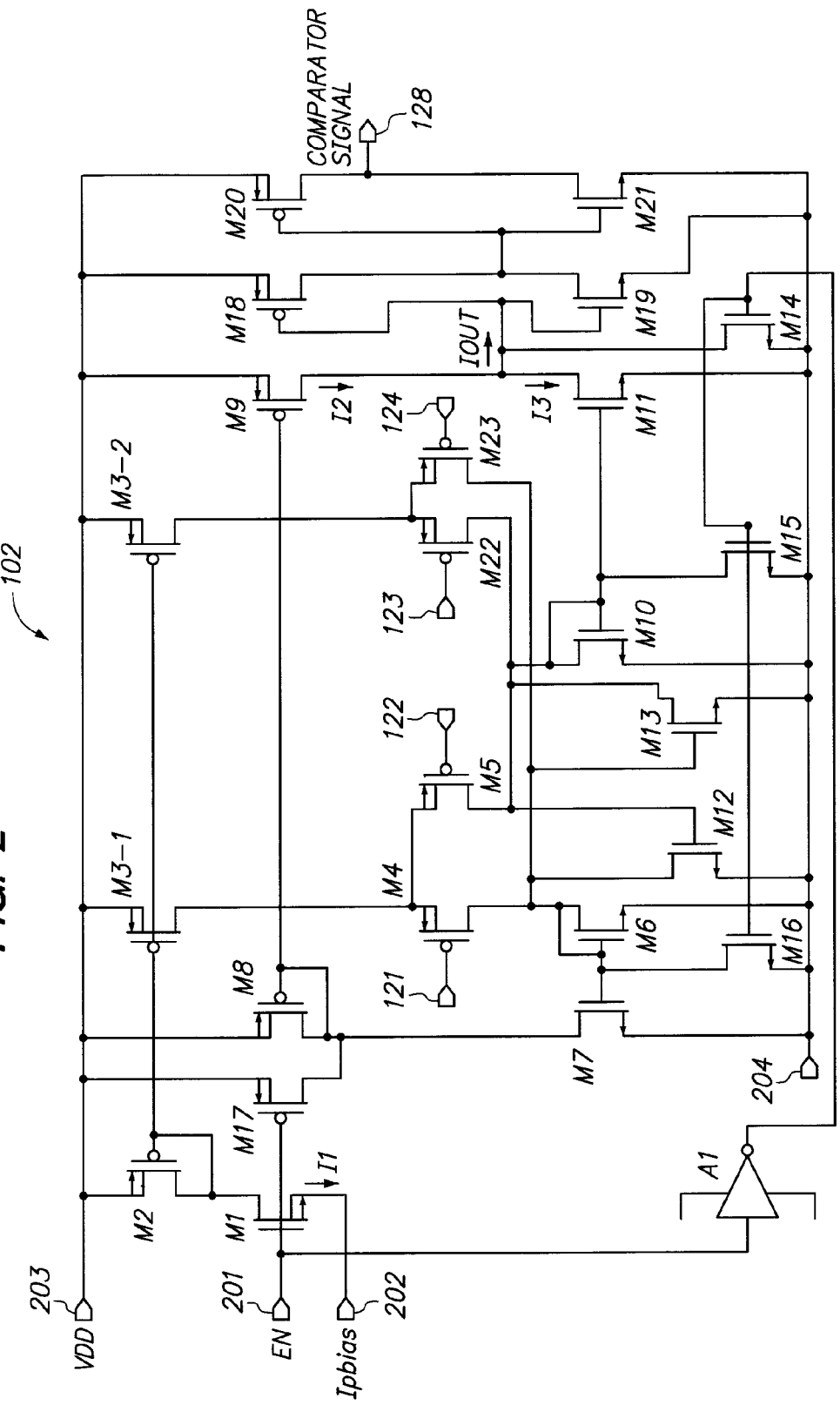
FIG. 2 schematically shows details of a hysteretic comparator in the hysteretic DC-DC converter of FIG. 1, in accordance with an embodiment of the present invention.

FIG. 2 schematically shows details of the hysteretic comparator 102 in accordance with an embodiment of the present invention. In the example of FIG. 2, the nodes 121, 122, 123, 124, and 128 are coupled to other components of the converter 100 in the manner shown in FIG. 1.

Still referring to FIG. 2, PMOS transistors M2 and M3−1 form a first current mirror that mirrors a bias current I1 to provide bias current to a first differential amplifier comprising PMOS transistors M4 and M5. The first differential amplifier compares the reference voltage VREF at the node 121 to the output voltage VOUT at the node 122. The resulting current through the transistor M4 of the first differential amplifier is mirrored by a second current mirror formed by NMOS transistors M6 and M7 and again by a third current mirror formed by PMOS transistors M8 and M9 as the current I2. The resulting current through the transistor M5 of the first differential amplifier is mirrored by a fourth current mirror formed by NMOS transistors M10 and M11 as the current I3. The resulting output current IOUT is the difference between the current I2 mirrored from transistor M4 and the current I3 mirrored from transistor M5. A first inverter comprising PMOS transistor M18 and NMOS transistor M19 and a second inverter comprising PMOS transistor M20 and NMOS transistor M21 provide buffering to present the output current IOUT as the comparison signal at the node 128 (see also FIG. 1). NMOS transistors M12 and 13 create extra gain (double in the example) by mirroring each branch and subtracting them from each other.

PMOS transistors M2 and M3−2 form a fifth current mirror that mirrors the bias current I1 to provide bias current to a second differential amplifier comprising the PMOS transistors M22 and M23. The second differential amplifier compares the reference signal ground at the node 123 to the load ground at the node 124. As shown in FIG. 2, the second differential amplifier is tied to the same nodes as the first differential amplifier to use essentially the same mirroring scheme. This results in the output current IOUT to be indicative of the difference between (a) a first difference between the reference voltage VREF and the output voltage VOUT and (b) a second difference between the reference signal ground and the load ground in accordance with EQ. 3. The mirroring scheme and the configuration of the transistors M9 and M11 convert the first and second difference to a single-ended output current IOUT, which is buffered and presented at the node 128 as the comparator signal. The second difference subtracts noise coupled between the reference signal ground and the load ground, thereby improving noise immunity of the hysteretic DC-DC converter. This allows the system-level designer to use the converter with less restrictive layout requirements and also improves the high current performance of the converter, where noise is most troublesome.

In the example of FIG. 2, the hysteretic comparator 102 optionally includes a feature to disable the comparator by switching OFF bias current and to shut down portions of the comparator. As shown in FIG. 2, an NMOS transistor M1 receives an enable signal EN at a node 201 to enable or disable the flow of the bias current I1. The enable signal is also coupled to NMOS transistor M17 and, by way of an inverter A1, to NMOS transistors M14, M15, and M16 to shutdown portions of the comparator when the comparator is disabled. VDD and VSS power supplies are provided to the comparator 102 at nodes 203 and 204, respectively.

Figure 3:
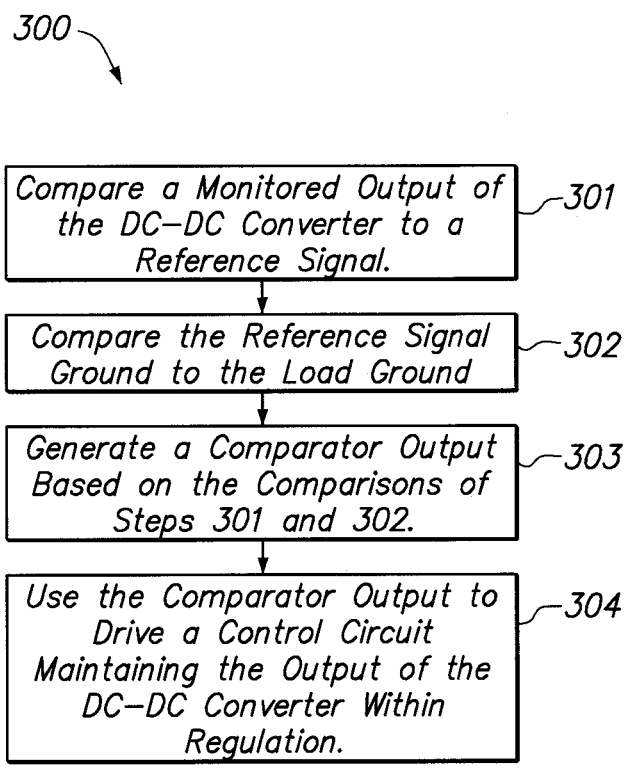
FIG. 3 shows a method of operating a hysteretic DC-DC converter in accordance with an embodiment of the present invention.

FIG. 3 shows a method 300 of operating a hysteretic DC-DC converter in accordance with an embodiment of the present invention. The method 300 may be performed by the converter 100 of FIG. 1, for example.

In step 301, a monitored output of the hysteretic DC-DC converter is compared to a reference signal. In one embodiment, the output of the converter comprises an output voltage delivered to a load, while the reference signal comprises a reference voltage generated by a bandgap reference circuit. The comparison of step 301 may be performed by a first differential amplifier of a differential hysteretic comparator (e.g., hysteretic comparator 102 of FIG. 1).

In step 302, a second differential amplifier of the hysteretic comparator compares the reference signal ground of the reference signal to the load ground.

In step 303, the hysteretic comparator generates a comparator output based on the comparison of the reference signal to the monitored output and the comparison of the reference signal ground to the load ground. The comparator output may indicate whether the output voltage of the converter is greater or less than the reference voltage.

In step 304, the comparator output is provided to a control circuit configured to maintain the output of the converter to within a regulation voltage. For example, the control circuit may use the comparator output to determine whether the output voltage is higher or lower than the regulation voltage and to accordingly decrease or increase the output voltage, respectively.

Table 1 shows simulation run results comparing the pulse widths of control outputs of two hysteretic DC-DC converters, one of which uses the hysteretic comparator 102 and another uses a single-ended hysteretic comparator. The single-ended hysteretic comparator is similar to the hysteretic comparator 102 shown in FIG. 2 without a second differential amplifier for comparing the reference signal ground to the load ground.

TABLE 1

| ΔR Load Ground-VSS | PW (comparator 102) | PW (Single-ended) |
|---|---|---|
| 0 | 308 μs | 318 μs |
| 3 mΩ | 299 μs | 267 μs |
| 6 mΩ | 309 μs | 191 μs |
| 10 mΩ | 318 μs | 244 μs |
| 15 mΩ | 366 μs | 89 ns (double pulse) |
| 20 mΩ | 417 μs | 308 ns (double pulse) |

In the example of Table 1, the first column is the resistance between the load ground and the negative power supply of the reference circuit. The second and third columns indicate the pulse width of the output of the control circuit for the hysteretic DC-DC converter with the hysteretic comparator 102 and with the single-ended hysteretic comparator, respectively. In the first row, a ΔR of "0" indicates no parasitic resistance to cause noise. Note the relative stability of the pulse width in the converter with the comparator 102, relative to the single-ended comparator, until about ΔR of 15 mΩ and 20 mΩ. At those levels of ΔR, the single-ended comparator resulted in the double pulsing of the output of the converter, indicating major instability of the system. Compared to the converter with the single-ended comparator, the converter with the comparator 102 is relatively stable across a wider range of ΔR, indicating superior noise immunity. The table is an example of the effect of resistance on the ground circuit: the duty cycle is strongly affected when a standard comparator is utilized. In actual circuit implementation, the inductive component of the ground return is even more relevant to the effect of noise because the load current is switched with very high di/dt in the output stage, thus generating large AC noise components in the ground paths.

FIGS. 4-8 show simulation waveforms comparing the use of a conventional hysteretic comparator to a differential hysteretic comparator in accordance with an embodiment of the present invention in a hysteretic DC-DC converter. Each of FIGS. 4-8 shows, from top to bottom, the output voltage VOUT ("/VOUT"), the output control signal generated by the converter's control circuit at the switch node ("/SW"), the inductor current ("/L0/PLUS"), and the induced noise on the load ground ("/PGND").

As can be appreciated, ground noise is typically due to parasitic impedance, composed of resistive and inductive components, such as those from printed circuit board layout traces. In FIGS. 4-8, ground noise is simulated by introducing resistance on the ground. While not exactly the same as real world conditions, the simulation shows how a conventional hysteretic comparator and a differential hysteretic comparator might operate in the presence of ground noise.

Figure 4:
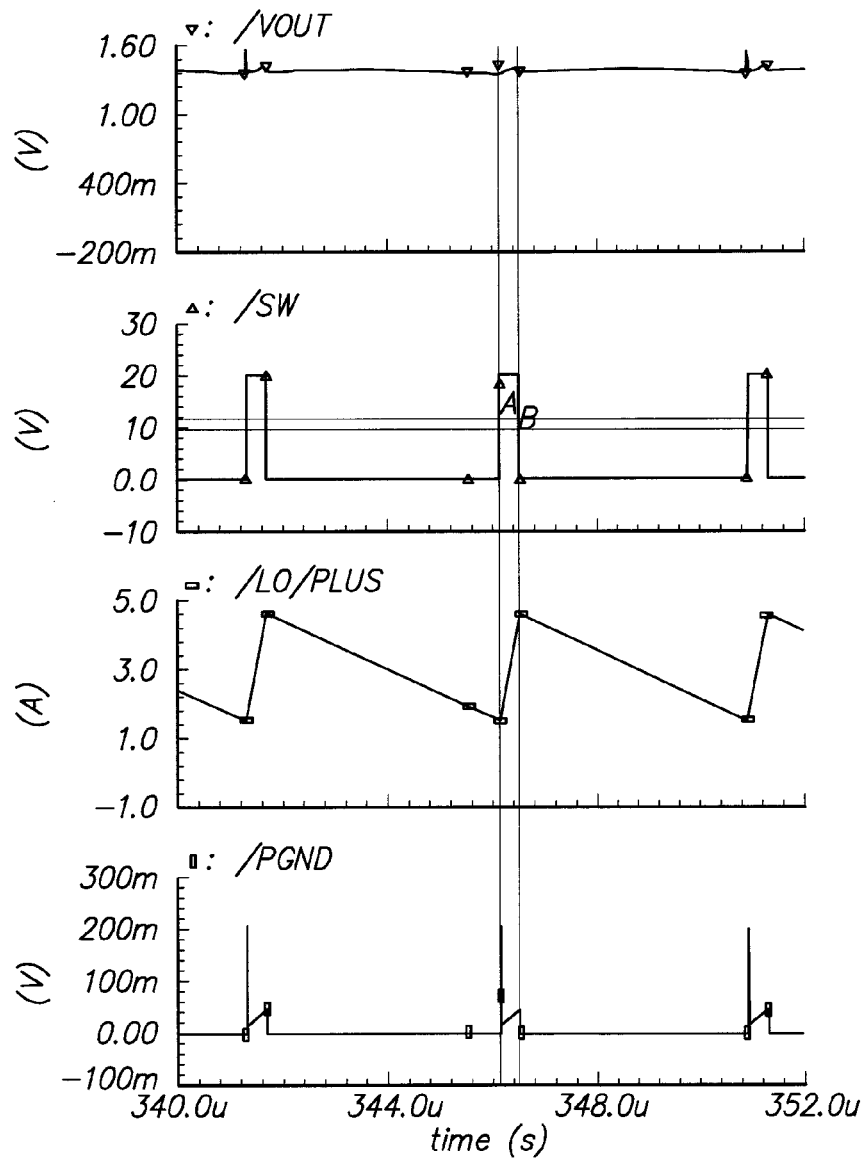
FIGS. 4-8 show simulation waveforms comparing the use of a conventional hysteretic comparator to a differential hysteretic comparator in accordance with an embodiment of the present invention in a hysteretic DC-DC converter.
Figure 5:
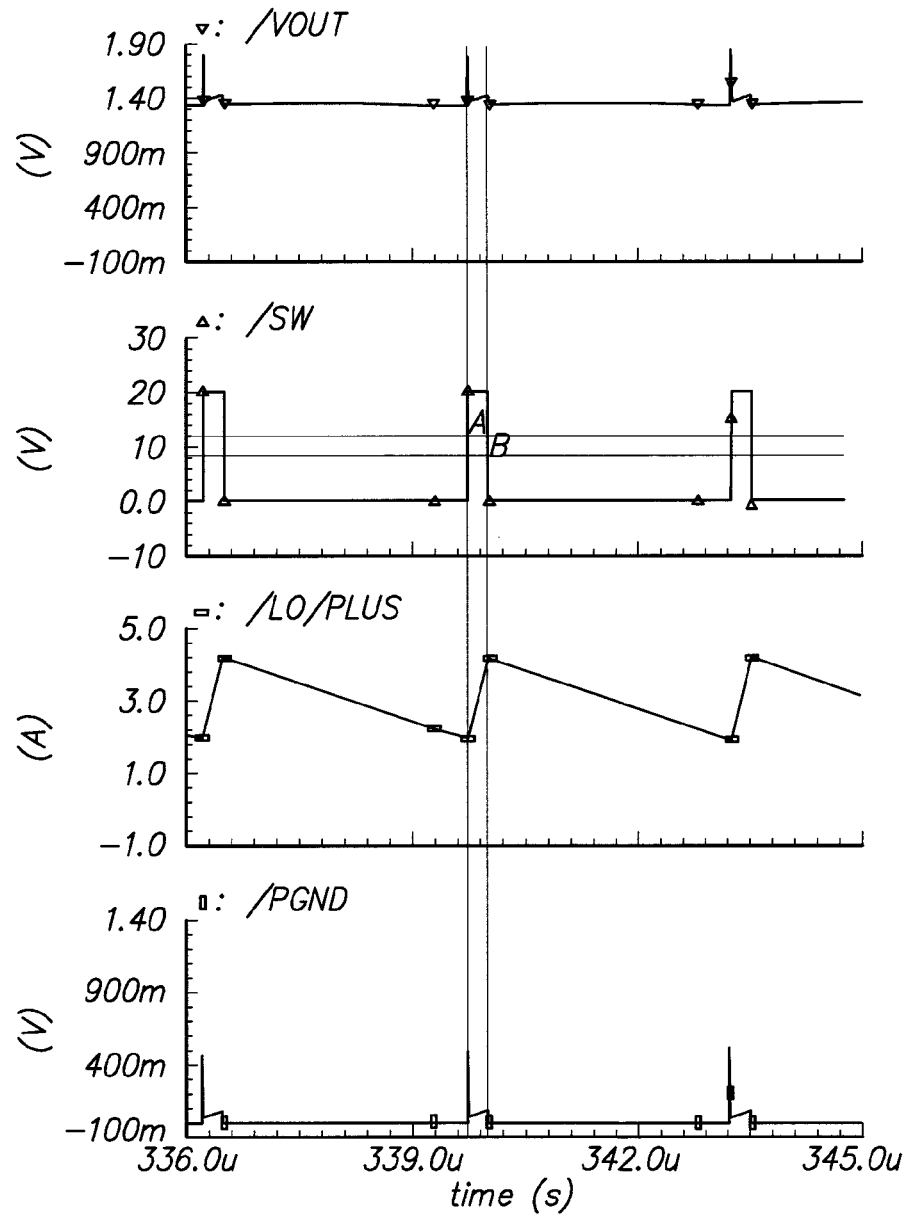
Figure 6:
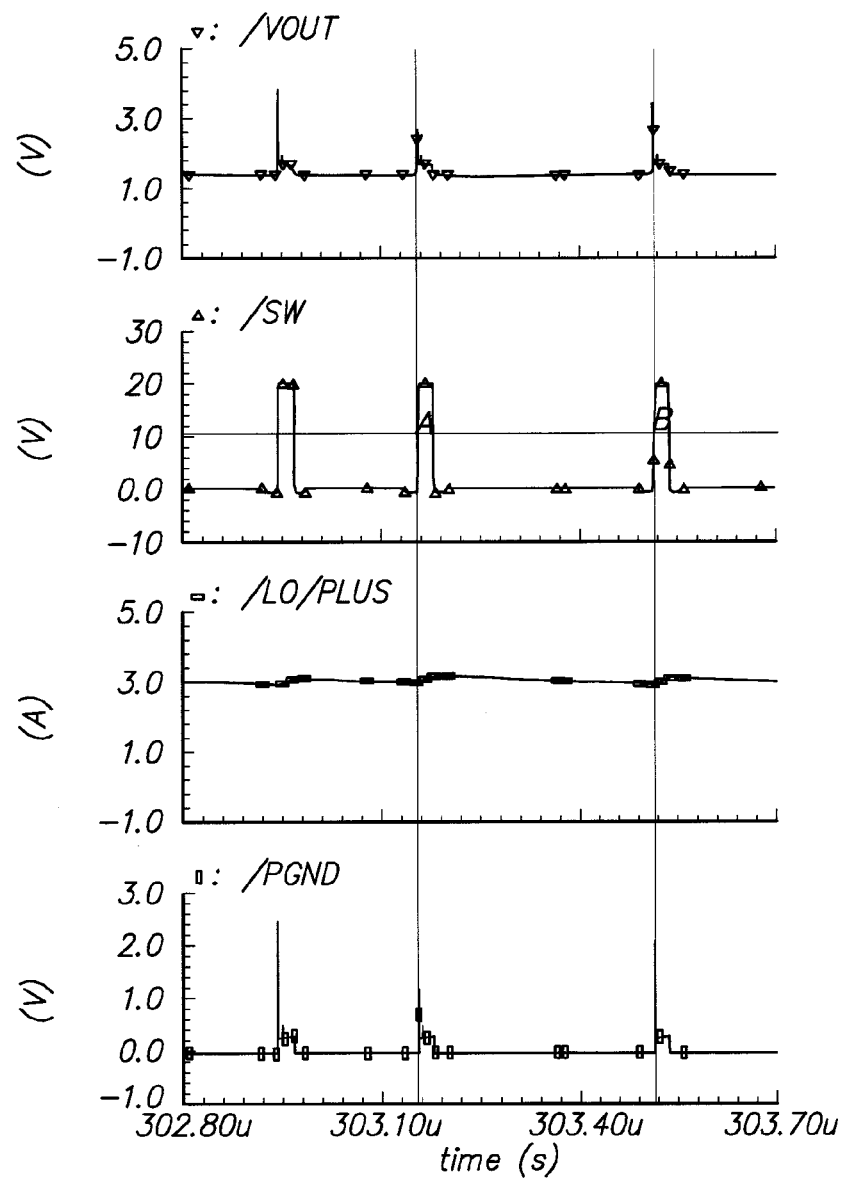

FIGS. 4, 5, and 6 show simulated waveforms for the hysteretic DC-DC converter with conventional hysteretic (i.e., non-differential) comparator. The conventional hysteretic comparator responds to the influence of noise on the ground by reducing the pulse width of the control signal at the switch node, introducing random variations in switch duty cycle. The reference ground has a resistance of 0.01Ω in FIG. 4 and a resistance of 0.02Ω in FIG. 5. Note that doubling the ground resistance, as in the change from FIG. 4 to FIG. 5, increases the ground noise and reduces the pulse width of control signal at the switch node (see "/SW"). The pulse width of the control signal is 374 ns in FIG. 4 and narrows to 272 ns in FIG. 5. FIG. 6 shows the resulting variation in the duty cycle. In FIG. 6, the time between control signal pulses at the switch node varies unpredictably.

Figure 7:
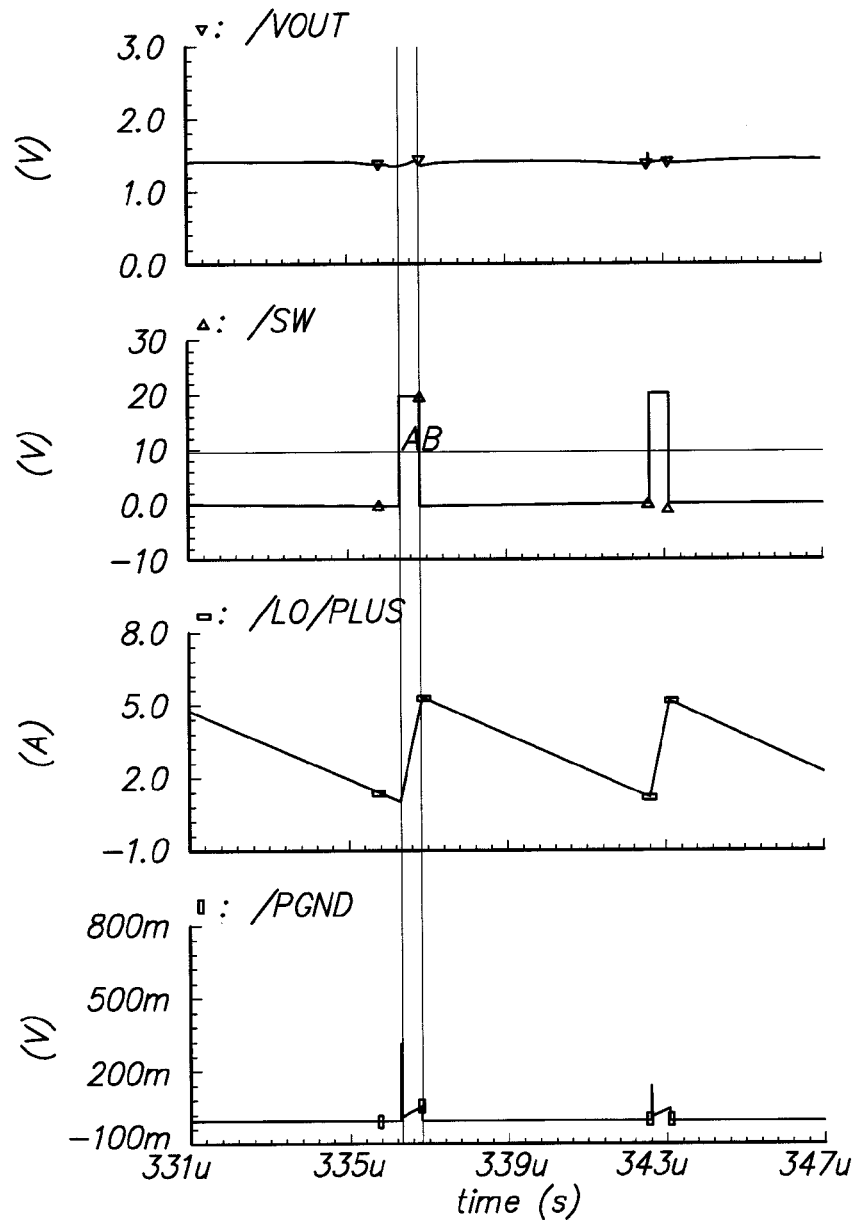
Figure 8:
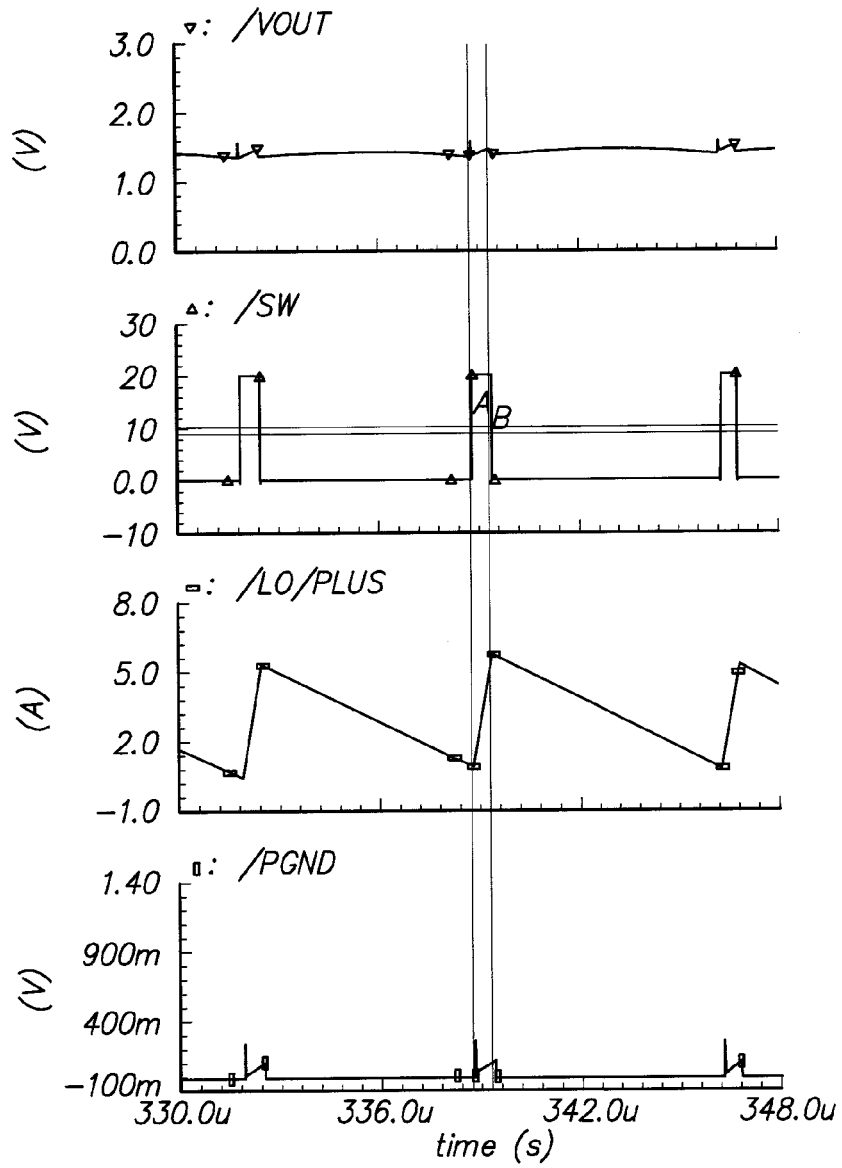

FIGS. 7 and 8 show simulated waveforms for the hysteretic DC-DC converter with a differential hysteretic comparator, such as the comparator 102 of FIG. 1. In the case of the differential hysteretic comparator, the influence of ground noise is reduced and the control circuit is better able to maintain the correct duty cycle. The reference ground has a resistance of 0.01Ω in FIG. 7 and a resistance of 0.02Ω in FIG. 8. Doubling the ground resistance, as in the change from FIG. 7 to FIG. 8, increases the ground noise but does not appreciably affect the pulse width of the control signal at the switch node. The pulse width of the control signal at the switch node is 523 ns in FIG. 7 and is 593 ns in FIG. 8. Also note the stable spacing between the control signal pulses.

An improved hysteretic DC-DC converter and method of operating same have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A hysteretic DC-DC converter comprising:
    a reference circuit configured to generate a reference signal;
    a hysteretic comparator having a first differential amplifier and a second differential amplifier, the hysteretic comparator being configured to compare a monitored output signal to the reference signal using the first differential amplifier to generate a first difference signal and to compare a load ground to a reference signal ground using the second differential amplifier to generate a second difference signal, the hysteretic comparator being further configured to add the first difference signal to the second difference signal and to generate an output signal based on the addition of the first difference signal and the second difference signal, the output signal being indicative of an output of the converter provided to a load, the load ground being a ground reference of the load and the reference signal ground being a ground reference of the reference signal; and
    a control circuit configured to maintain the output of the converter provided to the load within regulation based on the output signal of the hysteretic comparator.

2. The hysteretic DC-DC converter of claim 1 wherein the reference circuit comprises a bandgap reference circuit.

3. The hysteretic DC-DC converter of claim 1 wherein the control circuit generates a control circuit output signal and modulates the control circuit output signal based on the output signal of the hysteretic comparator.

4. The hysteretic DC-DC converter of claim 1 wherein the output signal of the hysteretic comparator is a single-ended signal.

5. The hysteretic DC-DC converter of claim 1 wherein the hysteretic comparator is configured to receive an enable signal to enable or disable the hysteretic comparator.

6. A method of operating a hysteretic DC-DC converter, the method comprising:

comparing an output of a hysteretic DC-DC converter to a reference signal to generate a first difference signal;

comparing a load ground to a reference signal ground to generate a second difference signal, the load ground being a ground reference of the output of the converter and the reference signal ground being a ground reference of the reference signal;

generating a comparator output by adding together the first difference signal and the second difference signal; and providing the comparator output to a control circuit, the control circuit being configured to regulate the output of the converter based on the comparator output.

7. The method of claim 6 wherein the output of the converter is compared to the reference signal using a first differential amplifier and the load ground is compared to the reference signal ground using a second differential amplifier.

8. The method of claim 7 wherein the first differential amplifier and the second differential amplifier are part of a hysteretic comparator.

9. The method of claim 6 wherein the reference signal is generated by a bandgap reference circuit.

10. The method of claim 6 wherein the comparator output comprises a single-ended signal.

11. The method of claim 6 wherein the control circuit generates a control output that is modulated based on the comparator output.

12. A hysteretic DC-DC converter comprising:

a reference circuit configured to generate a reference voltage, the reference voltage having a reference signal ground as ground reference;

a hysteretic comparator configured to compare a load ground and the reference signal ground to generate a first difference signal and to compare an output voltage of the converter and the reference voltage to generate a second difference signal, the hysteretic comparator being further configured to add together the first difference signal and the second difference signal to generate a comparator output, the load ground being a ground reference of the output voltage of the converter; and a control circuit configured to vary the output voltage of the converter based on the comparator output.

13. The hysteretic DC-DC converter of claim 12 wherein the reference circuit comprises a bandgap reference circuit.

14. The hysteretic DC-DC converter of claim 12 wherein the hysteretic comparator includes a first differential amplifier configured to perform the comparison of the output voltage of the converter to the reference voltage and a second differential amplifier configured to perform the comparison of the reference signal ground to the load ground.

15. The hysteretic DC-DC converter claim 12 wherein the hysteretic comparator is configured to receive an enable signal to enable or disable the hysteretic comparator.

16. The hysteretic DC-DC converter of claim 12 wherein the comparator output is a single-ended signal.

17. The hysteretic DC-DC converter of claim 12 wherein the control circuit varies the output voltage by modulating a control output signal based on the comparator output.

* * * * *